US008540160B2

(12) United States Patent
Luongo, Jr. et al.

(10) Patent No.: US 8,540,160 B2
(45) Date of Patent: Sep. 24, 2013

(54) CARD CARRIER HAVING EXTENDED TRANSACTION CARD

(75) Inventors: Philip J. Luongo, Jr., San Francisco, CA (US); Ted Biskupski, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 151 days.

(21) Appl. No.: 12/879,001

(22) Filed: Sep. 9, 2010

(65) Prior Publication Data

US 2012/0061472 A1 Mar. 15, 2012

(51) Int. Cl.
*G06K 7/00* (2006.01)

(52) U.S. Cl.
USPC ............ 235/486; 235/487; 235/383; 235/380

(58) Field of Classification Search
USPC .................. 235/487, 486, 383; 186/224, 206
See application file for complete search history.

(56) References Cited

U.S. PATENT DOCUMENTS

| | | | |
|---|---|---|---|
| 3,346,294 | A | 10/1967 | Sartz |
| 4,319,684 | A | 3/1982 | Backman et al. |
| 4,828,105 | A | 5/1989 | Silengo et al. |
| 5,036,645 | A | 8/1991 | Schwarz |
| 5,135,157 | A | 8/1992 | Cruz |
| 5,139,454 | A | 8/1992 | Earnest |
| 5,143,279 | A | 9/1992 | Gaines |
| 5,219,184 | A | 6/1993 | Wolf |
| D344,757 | S | 3/1994 | Kruyt |
| 5,516,033 | A | 5/1996 | Bernetich |
| 5,573,117 | A | 11/1996 | Adams |
| 5,575,384 | A | 11/1996 | Saye |
| 5,626,551 | A | 5/1997 | Kearns et al. |
| 5,641,115 | A | 6/1997 | Brewster |
| 5,645,214 | A | 7/1997 | Taganas |
| 5,687,992 | A | 11/1997 | Finkelshteyn |
| 5,791,474 | A | 8/1998 | Hansen |
| D400,919 | S | 11/1998 | Pickel |
| 5,845,425 | A | 12/1998 | Leake et al. |
| 5,862,979 | A | 1/1999 | Hill et al. |
| 5,906,063 | A | 5/1999 | Magee, Sr. |
| 5,918,909 | A | 7/1999 | Fiala et al. |
| 5,941,573 | A | 8/1999 | Yordinsky |
| 5,946,834 | A | 9/1999 | Bradley |
| 5,963,915 | A | 10/1999 | Kirsch |
| 5,963,916 | A | 10/1999 | Kaplan |

(Continued)

FOREIGN PATENT DOCUMENTS

| | | |
|---|---|---|
| EP | 0725376 | 8/1996 |
| EP | 0927945 | 7/1999 |

(Continued)

OTHER PUBLICATIONS

"Identification Cards—Recording Technique—Part 7: Magnetic Strip—High Coercivity, High Density", ISO Standard, ISO/IEC 7811-7:2004 downloaded Dec. 26, 2007, 2 pgs.

(Continued)

*Primary Examiner* — Kristy A Haupt

(57) ABSTRACT

A transaction card carrier is disclosed. The transaction card carrier may include a transaction card having substantially the same width as the transaction card carrier. The transaction card may also be secured on the transaction card carrier such that at least one scan bar positioned on the back surface of the transaction card is visible and accessible without manipulating the transaction card carrier.

21 Claims, 10 Drawing Sheets

(56) References Cited

U.S. PATENT DOCUMENTS 5,984,091 A 11/1999 Orr et al.
6,003,254 A 12/1999 Lorber
6,053,321 A 4/2000 Kayser
6,070,719 A 6/2000 Pollock
6,092,841 A 7/2000 Best et al.
6,199,912 B1 3/2001 Finkelshteyn
6,224,108 B1 5/2001 Klure
6,233,682 B1 5/2001 Fritsch
D447,055 S 8/2001 Several et al.
6,270,012 B1 8/2001 Dawson
6,299,530 B1 10/2001 Hansted et al.
D457,555 S 5/2002 Stephens-D'Angelo et al.
6,385,596 B1 5/2002 Ansell et al.
6,418,648 B1 7/2002 Hollingsworth et al.
6,457,638 B1 10/2002 Schmidt
6,491,213 B2 12/2002 Purcell
6,588,596 B1 7/2003 Holmes et al.
6,619,480 B2 9/2003 Smith
6,659,271 B2 12/2003 Parsons
6,698,116 B2 3/2004 Waldron
6,731,312 B2 5/2004 Robbin
6,877,263 B2 4/2005 Clark
6,957,737 B1 10/2005 Frederickson et al.
D512,456 S 12/2005 Diaz et al.
7,040,049 B2 5/2006 Cox et al.
7,055,740 B1 6/2006 Schultz et al.
7,080,776 B2 7/2006 Lewis et al.
7,204,048 B2 4/2007 Kershner et al.
D548,279 S 8/2007 Gulakos
7,277,870 B2 10/2007 Mourad et al.
7,278,584 B1 10/2007 Gandel et al.
7,322,519 B2 1/2008 Blank et al.
7,367,504 B2 5/2008 Lewis et al.
7,409,788 B2 8/2008 Lauer et al.
7,490,720 B2 2/2009 Cole et al.
7,500,604 B2 3/2009 Holme
7,546,288 B2 6/2009 Springer et al.
7,740,170 B2 6/2010 Singh et al.
7,837,125 B2 11/2010 Biskupski et al.
2001/0034703 A1 10/2001 Picciallo et al.
2002/0002468 A1 1/2002 Spagna et al.
2002/0080714 A1 6/2002 Pierson et al.
2002/0088855 A1 7/2002 Hodes
2002/0147683 A1 10/2002 Capobianco et al.
2002/0157974 A1 10/2002 Krahn
2002/0195816 A1 12/2002 Anise
2003/0004889 A1 1/2003 Fiala et al.
2003/0018586 A1 1/2003 Krahn
2003/0150142 A1 8/2003 Street
2003/0156686 A1 8/2003 Pines
2003/0230501 A1 12/2003 Smolev
2004/0064374 A1 4/2004 Cho
2004/0140361 A1 7/2004 Paul et al.
2004/0254836 A1 12/2004 Barabas et al.
2004/0267622 A1 12/2004 Taylor et al.
2004/0268386 A1 12/2004 Logan et al.
2005/0100312 A1 5/2005 Commons et al.
2005/0167301 A1 8/2005 Oram
2005/0171795 A1 8/2005 Kearby et al.
2005/0182675 A1 8/2005 Huettner
2006/0032764 A1 2/2006 Swenson
2006/0042986 A1 3/2006 Simkowski
2006/0065748 A1 3/2006 Halbur et al.
2006/0086630 A1 4/2006 Cheong et al.
2006/0118618 A1 6/2006 Schultz et al.
2006/0185201 A1 8/2006 Fachon et al.
2006/0212401 A1 9/2006 Ameerally et al.
2006/0224516 A1 10/2006 Lemon et al.
2006/0235864 A1 10/2006 Hotelling et al.
2006/0243609 A1 11/2006 Cole et al.
2006/0259189 A1 11/2006 Perlow et al.
2006/0261154 A1 11/2006 Arthur et al.
2007/0038577 A1 2/2007 Werner et al.
2007/0063052 A1 3/2007 Chakiris et al.
2007/0090184 A1 4/2007 Lockwood et al.
2007/0154167 A1 7/2007 Ando et al.
2007/0174200 A1 7/2007 Sung-Min et al.
2007/0187492 A1 8/2007 Graves et al.
2007/0198418 A1 8/2007 Macdonald et al.
2007/0208664 A1 9/2007 Ortega
2007/0224969 A1 9/2007 Rao
2007/0251994 A1* 11/2007 Kingsborough et al. ..... 235/380
2007/0267502 A1 11/2007 Zellner et al.
2007/0278280 A1 12/2007 Wert et al.
2008/0052371 A1 2/2008 Partovi et al.
2008/0116088 A1 5/2008 Roberts
2008/0116089 A1* 5/2008 Roberts ......................... 206/232
2008/0120609 A1 5/2008 Gates et al.
2008/0154722 A1 6/2008 Galinos
2008/0159715 A1 7/2008 Fuasaro et al.
2008/0173721 A1* 7/2008 Tang ............................ 235/494
2008/0188209 A1 8/2008 Dorogusker et al.
2008/0190267 A1 8/2008 Rechsteiner et al.
2008/0320139 A1 12/2008 Fukuda et al.
2009/0063292 A1 3/2009 Cole et al.
2009/0104539 A1 4/2009 Watanabe et al.
2009/0218392 A1 9/2009 Biskupski et al.
2009/0283594 A1 11/2009 Walton et al.
2010/0219099 A1 9/2010 Schmitt et al.

FOREIGN PATENT DOCUMENTS

EP 1111562 6/2001
FR 2827981 1/2003
WO WO99/24942 A 5/1999
WO WO00/28461 5/2000
WO WO00/43852 7/2000
WO WO00/62265 10/2000
WO WO01/41023 6/2001
WO WO01/44908 6/2001
WO WO01/46786 6/2001
WO WO01/50305 7/2001
WO WO02/08869 1/2002
WO 2004/038567 A 5/2004
WO 2004/044770 A 5/2004

OTHER PUBLICATIONS

"American National Standard Specifications for Credit Cards", American National Standards Institute, Inc. (ANSI), x4.13-1971, 1971, 18 pgs.

"American National Standard Magnetic-Stripe Encoding for Credit cards", American National Standards Institute, Inc. (ANSI), x4.16-1976, 1976, 12 pgs.

Offenberg, J. "Markets—Gift Cards", Journal of Economic Perspectives, vol. 21, No. 2, Spring 2007, pp. 227-238.

"Identification Cards-Recording Technique", International Standard ISO/IEC, vol. 7811-2, No. Third Edition, Feb. 1, 2001, pp. 1-21.

Pottery Barn, Gift Cards, Web Page, downloaded Jun. 27, 2008, 1 pg.

"List." Dictionary of Publishing and Printing. London: A&C Black, 2006, www.credoreference.com/entry/acbpublishing/list, p. 1.

"Listing." Collins English Dictionary. London: Collins, 2000, www.credoreference.com/entry/hcengdict/listing, p. 1.

"Bin." Collins English Dictionary, London: Collins, 2000, www.credoreference.com/entry/hcengdict/bin, p. 1.

"Rack 1",Collins English Dictionary, London, Collins 2000, www.credoreference.com/entry/hcengdictrack_1, 1 pg.

"Price", Chambers 21st Century Dictionary, London, Chambers Harrap, 2001, www.credoreference.com/entry/chambdict/price, 1 pg.

"Allow", Webster's Third New International Dictionary, Merriam-Webster, downloaded Jul. 14, 2009, http://lionreference.chadwyck.com/searchFulltext.do?id=871261&idType=offset&divLevel=2&queryId=../sessions/1247680262_19043&area=mwd&forward=refshelf&trail=refshelf, 2 pg.

"Value", Webster's Third New International Dictionary, Merriam-Webster, Incorporated, downloaded Jul. 15, 2009, http://lionreference.chadwyck.com/searchFulltext.do?id=38664807&idType=offset&divLevel=2&queryID=../session/1247683362_2487&area=mwd&forward=refshelf&trail=refshelf, p. 4.

"Media", Chambers 21st Century Dictionary, London, Chambers Harrap, 2001, downloaded Jul. 15, 2009, www.credoreference.com/entry/chambdict/media.com, 1 pg.

"Associate", Collins English Dictionary, London, Collins 2000, www.credoreference.com/entry/hcengdict/associate, 1 pg.
"Active", Webster's Third New International Dictionary, Merriam-Webster, Inc., downloaded Jul. 16, 2009, http://lionreference.chadwyck.com/searchFulltextdo?id=313560&idType=offset&divLevel=2&queryID=../session/1247778592_27918&area=mwd&forward=refshelf&trail=refshelf, 3 pg.
"Activate"Webster's Third New International Dictionary Merriam-Webster Inc. downloaded Jul. 16 2009, http://lionreference.chadwyck.com/searchFulltext.do?id=312239&idType=offset&divLevel=2&queryID=../session/1247778879_29216&area=mwd&forward=refshelf&trail=refshelf, 2 pg.
The Bank Credit Card Business, 2nd Edition, American Bankers Association, Washington D.C., 1996, pp. 1-13, 63-89.
Smart Card Handbook, 2nd Edition, W. Rankl and W. Effing, John Wiley and Sons, West Sussex, England, 2000, 49 pgs.

* cited by examiner

CARD CARRIER HAVING EXTENDED TRANSACTION CARD

FIELD OF THE INVENTION

The present invention relates generally to carriers for transaction cards. More particularly, the present invention relates to improved packaging of transaction cards via transaction card carriers.

BACKGROUND

Gift cards are legal tender purchased for use by a person and usable in its face amount in lieu of cash in exchange for goods or services supplied by the seller. They are similar to credit cards in makeup except that they have a banked dollar value. Gift cards may designate the amounts contained therein, or they may be programmable to any value, i.e., varying amounts may be assigned to the gift card at time of purchase. Gift cards are typically given as gifts in lieu of a physical present.

Gift cards are generally associated with particular retail store, i.e., the gift card can only be used at that store. Alternatively, the gift cards may be issued by financial institutions such as bank or credit card companies. These cards are generally accepted anywhere the institution is accepted, i.e., they act like a credit card.

Gift cards are typically formed from a plastic material that includes a magnetic strip or bar code strip on its back surface. The magnetic strip or bar code contains the dollar amount of the gift card. The gift cards may also include a code with a dollar amount assigned thereto. When used at a brick and mortar store as for example by swiping the strip at a register, the amount is typically reduced by the purchase price of the item being purchased. When used at an online store, for example, a user will enter the code, the original amount may be assigned to a particular user account, and thereafter this amount can be reduced by the purchase price of the item being purchased.

Gift cards may also include information about the seller of the gift card on its front surface (e.g., logos, company name, etc.). The front surface of the gift cards may additionally or alternatively include random images, patterns or colors in order to make the gift cards more presentable and thus more like gifts. The back surface of the gift card may also include terms and conditions of the gift card, direction on how to use the gift card, and possibly the store title and original amount of the gift card.

The gift cards are typically packaged so that they can be placed on a display rack. In most cases, the plastic gift card is glued to a piece of cardboard backing such that the front surface of the gift card is in full view. The cardboard backing typically includes a hole so that the gift cards can hang from the display rack. The card board backing also typically includes decoration or ornamentation such as a store logo.

While this arrangement works, it is desirable to improve the packaging of the gift cards and their carriers in order to make them easier for purchase and use. When used at a brick and mortar store, the cashier must typically manipulate the packaging in order to swipe the strip at a register, such as removing the gift card and/or folding a portion of the gift card carrier to access the gift card. Thus, there is a need for improved gift card carrier.

SUMMARY

The invention relates, in one embodiment, to a transaction card carrier. The transaction card carrier may include a transaction card having substantially the same width as the transaction card carrier. The transaction card may also be secured on the transaction card carrier such that at least one scan bar positioned on the back surface of the transaction card is visible and accessible without manipulating the transaction card carrier.

In one embodiment, a transaction card carrier may have a holder having a first width, a top edge and a bottom edge, a transaction card having a front surface, a back surface, and second width, the back surface of the transaction card mounted on the holder, and at least one scan bar positioned on the back surface of the transaction card. When the transaction card is mounted on the holder, the at least one scan bar may extend beyond a bottom edge of the holder. Also, the first width may be substantially the same as the second width.

In another embodiment, a method of manufacturing a transaction card carrier may provide a transaction card panel having a first width and a bottom edge, the first width between a first edge and a second edge, provide a transaction card having a front surface and a back surface, the back surface including at least a scan bar, and secure the transaction card on the transaction card panel such that at least the one scan bar on a back surface of the transaction card extends beyond the bottom edge of the transaction card panel.

In yet another embodiment provides for a method of manufacturing a transaction card carrier, by providing a transaction card panel having a first width and a bottom edge, the first width between a first edge and a second edge, with the back surface including at least a scan bar; and then securing the transaction card on the transaction card panel such that at least the one scan bar on a back surface of the transaction card extends beyond the bottom edge of the transaction card panel.

BRIEF DESCRIPTION OF THE DRAWINGS

The invention may best be understood by reference to the following description taken in conjunction with the accompanying drawings in which.

DETAILED DESCRIPTION OF EXEMPLARY EMBODIMENTS

The invention pertains to improved transaction card carrier to hold a transaction card that does not have any value until purchased and activated at a point-of-sale. The transaction card carrier allows at least one scan bar of the transaction card to extend beyond a bottom edge or bottom portion of the transaction card carrier to allow a cashier to efficiently and easily swipe the scan bar without having to manipulate the transaction card carrier in any way or position.

The transaction card may be any card that does not have any value until purchased such as a prepaid card, gift card, or any other similar cards. In one embodiment, the transaction card is associated with a cash value that may be used after activation to purchase or retrieve products or services from sellers. In another embodiment, the transaction card is content specific and provided to allow acquisition of a particular digital asset, such as a collection of digital media assets, upon activation. As one example, the collection can pertain to a playlist, album or set of content. The transaction card can be embodied as a product (e.g., digital content) specific prepaid transaction card.

Embodiments of the invention are discussed below with reference to FIGS. 1A-5. However, those skilled in the art will readily appreciate that the detailed description given herein with respect to these figures is for explanatory purposes as the invention extends beyond these limited embodiments.

Figure 1A:
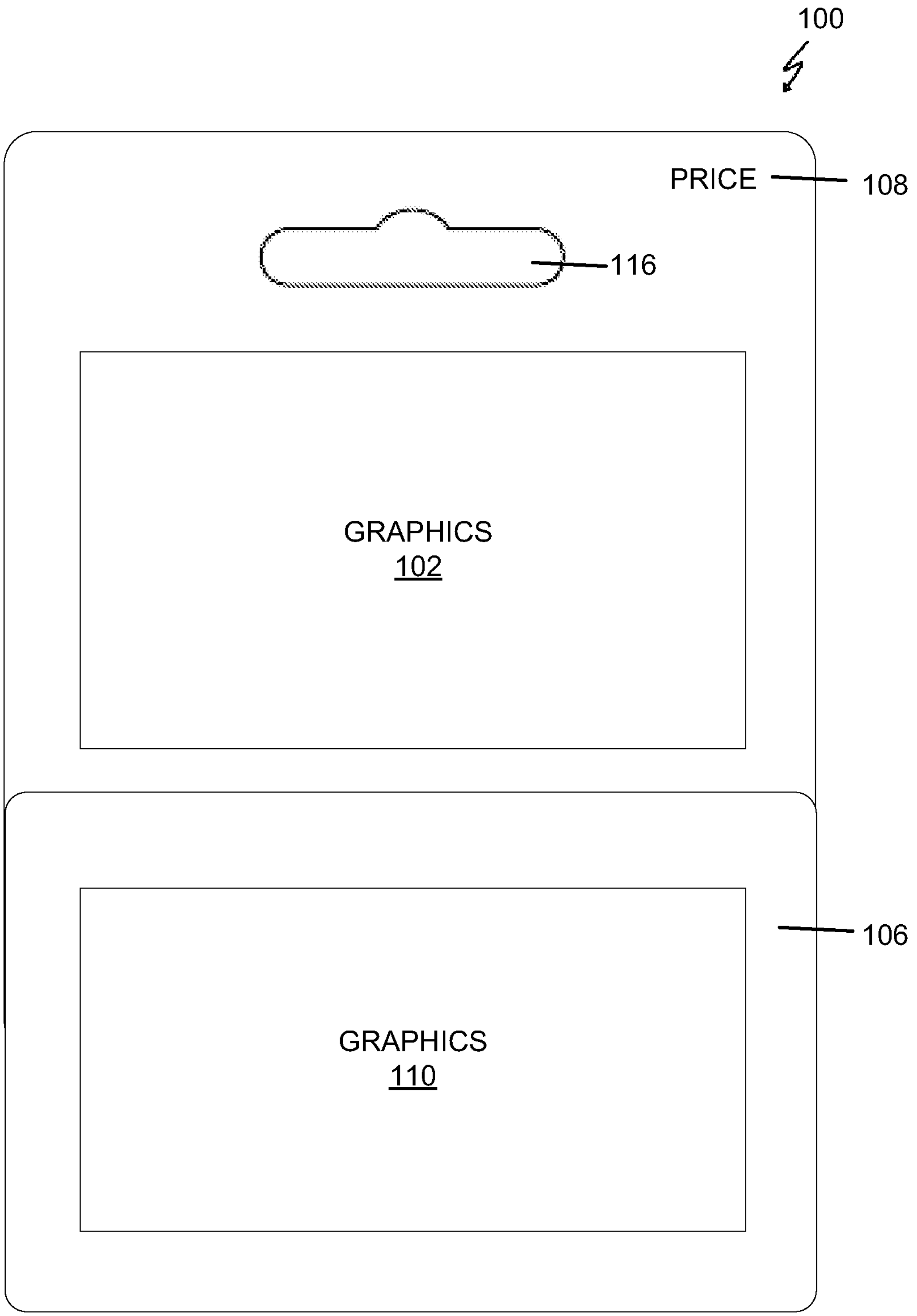
FIGS. 1A-1E are exemplary front and back diagrams of exemplary transaction card carriers.

FIGS. 1A-1E are an example front and back diagrams of exemplary transaction card carriers. FIG. 1A is an example front side or surface of a transaction card carrier having a transaction card. Both front surface of transaction card carrier 100 and front surface of transaction card 106 may include any type of graphics 102, 110, such as a message from the merchant, merchant logo, or the like. In one embodiment, graphics 102 of the transaction card carrier 100 matches the graphics 110 of the gift card 106 (e.g., have the same pattern or color).

Optionally, the graphics 102, 110 can be a holographic image or an image with a holographic effect. The front surface of transaction card carrier 100 may also include a site identifier 112 that identifies the merchant, merchant's website, or any other information. By way of example, site identifier 112 may identify the iTunes® online media store owned by Apple Inc. of Cupertino, Calif. as an online store from which the playlist is to be obtained. As should be appreciated, the online iTunes store of Apple Inc., now offers TV shows, movies, music videos, music albums, games, podcasts, for download to computers and media players and thus graphic images of those offerings may be associated with the online iTunes store of Apple Inc. and be used as graphics 102, 110. In fact, graphics 102, 110 may generally correspond to the icon images found at the online store.

The front surface of card carrier 100 may also include a price 108 associated with the purchase of the transaction card. For example, price 108 indicates a cost associated with downloading or obtaining a song from an online store identified by side identifier 112.

Transaction card 106 may generally be formed from any suitable material including, but not limited to, paper, plastic, or a reflective material such as holofoil. Suitable materials may include, but are not limited to, plastics, such as polyvinyl chloride (PVC) or more environmentally friendly plastics such as corn-based plastics (e.g., polylactic acid (PLA)).

In general, transaction card carrier 100 may be sized to fit into standard slots or bins used to hold CDs or gift cards at retail outlets such as third-party retail outlets or reseller locations. When CD-sized, the height of transaction card carrier 100 may be approximately 16.5 cm, while the width of transaction card carrier 100 may be approximately 12 cm. When gift card-sized, the height of transaction card carrier 100 may be approximately 9.8 cm, while the width of transaction card carrier 100 may be approximately 8.5 cm. As shown in FIG. 2B, transaction card carrier 100 may have an associated thickness "t" 148 that may be in the range of approximately 24-30 mils. It should be understood that the size of transaction card carrier 100 may vary widely. By way of example, thickness "t" 148 may be in the range of approximately 2 mils to approximately 100 mils. Additionally, by way of example, the height of transaction card carrier 100 may be approximately 3.9 inches while the width of transaction card carrier 100 may be approximately 3.4 inches, e.g., the height may be in the range between 10 approximately 2 inches and approximately 4 inches while the width may be in the range between approximately 2 inches and approximately 3 inches.

As illustrated in FIG. 1A, transaction card 106 may have a width that is substantially similar to the width of transaction card carrier 100. In one embodiment, transaction card 106 may have a width that is the same width of transaction card carrier 100. For example, if the transaction card carrier 100 is sized to fit into standard slots or bins used to hold CDs or gift cards at retail outlets such as third-party retail outlets or reseller locations, the width of transaction card 106 may also be approximately 12 cm. In another example, when transaction card carrier 100 is sized to be gift card-sized, the width of transaction card 106 may also be approximately 8.5 cm. By way of example, the width of transaction card 106 may be in the range between 2 inches and approximately 5 inches. In one embodiment, the height of transaction card 106 may be approximately 2.1 inches. By way of example, the height of transaction card 106 may be in the range between 1 inch and approximately 5 inches. In one example, transaction card 106 may be an industry standard CR80 card.

Transaction card carrier 100 is not limited to being displayed in bins at retail outlets. In many retail outlets, gift cards and the like are displayed in a hanging manner, e.g., openings defined within gift cards or gift card holders are used to enable the gift cards to be hung on dowels or other support apparatus. If transaction card carrier 100 is to be displayed in, or is likely to be defined in, a hanging manner, an opening 116 may be included on transaction card carrier 100. Such an optional opening 116 may generally take substantially any suitable shape, such as a "sombrero" shape as shown, a circular shape, or an ovular shape.

Figure 1B:
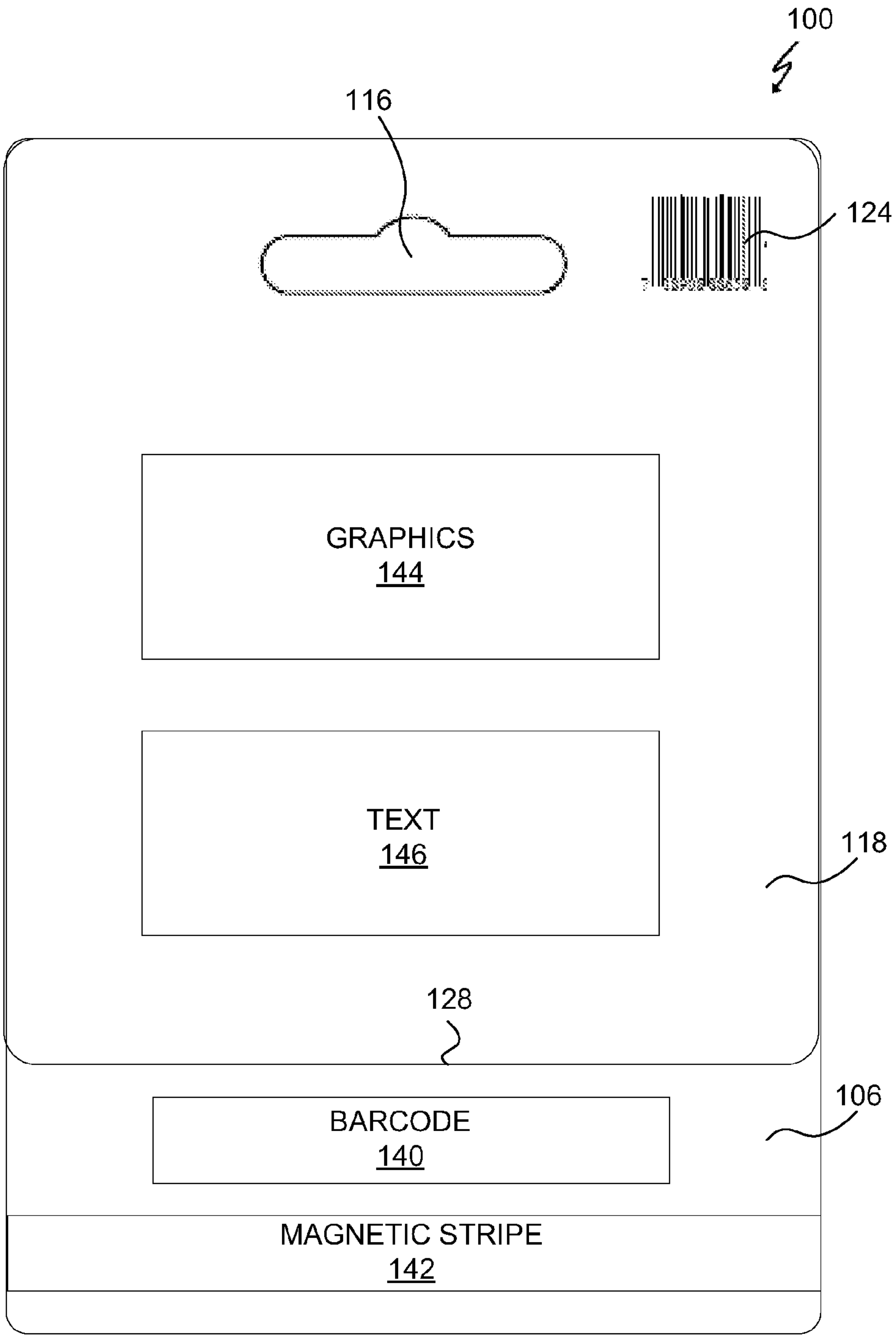

FIG. 1B illustrates an example back view of the transaction card carrier. Transaction card carrier 100 may include any graphics 144 and/or text 146. For example, graphics 144 may be a merchant's logo or any other graphics. In another example, text may include download instructions and/or transaction card information which allow a possessor of transaction card carrier 100 to obtain the digital files or redeem products associated with transaction card 106. For example, the transaction card information may include terms and conditions of the transaction card 106, directions on how to redeem the transaction card 106, and/or the like. A universal product code (UPC) code 124, which is arranged to be scanned as a part of an activation process, may be included on the back of transaction card carrier 100. UPC code 124 may be used at a point-of-sale to effectively charge price 108 to a purchaser for the purchase of transaction card carrier 100.

The back side of transaction card 106 may include at least one scan bar which may be used in the purchase of transaction card 106. The at least one scan bar may be, for example, a barcode 140, magnetic stripe 142, or any other scan bars that provide information or activation of transaction card 106. Bar code 140, which may be read by optical scanners or bar code readers, may include information that identifies transaction card 106. It should be understood that the format of bar code 140 may vary widely. By way of example, bar code 140 may be encoded in a code, a datamatrix 2D bar code format, or any other known format.

In one embodiment, bar code 140 may be a concealed unique code that may be concealed (or obscured) by a scratch-off material for security purposes. Bar code 140 may include an adhesive strip that is peeled off to expose a unique code, or a scratch-off label that is scratched off to expose unique code. Unique code may then be arranged to identify the playlist to be downloaded when unique code is provided to, or entered into, an appropriate website. While unique code may generally include any number of characters, e.g., numbers, unique code may include approximately sixteen characters in the described embodiment. It should be appreciated that until transaction card 106 is processed at a point-of-sale of transaction card carrier 100, i.e., until the magnetic stripe 142 is processed or swiped at a register to activate transaction card 106, transaction card 106 is essentially worthless in that digital files associated with list 120 cannot be accessed, because unique code is inactive. That is, the unique code is not redeemable for the digital files associated with list 120 until transaction card 106 is activated at a point-of-sale.

Transaction card 106 may include a magnetic stripe 142, in lieu of or in addition to a bar code 140. As will be appreciated by those skilled in the art, magnetic stripe effectively contains information that allows data stored remotely to be accessed by swiping magnetic stripe 142 past a card-reader head. A card reader head may be part of a point-of-sale device. Typically, magnetic stripe 142 is contained in a plastic-like film. As one example, magnetic stripe 142 may be located approximately 0.223 inches from the bottom edge of transaction card 106, and may have a height of approximately 0.375 inches.

Figure 1C:
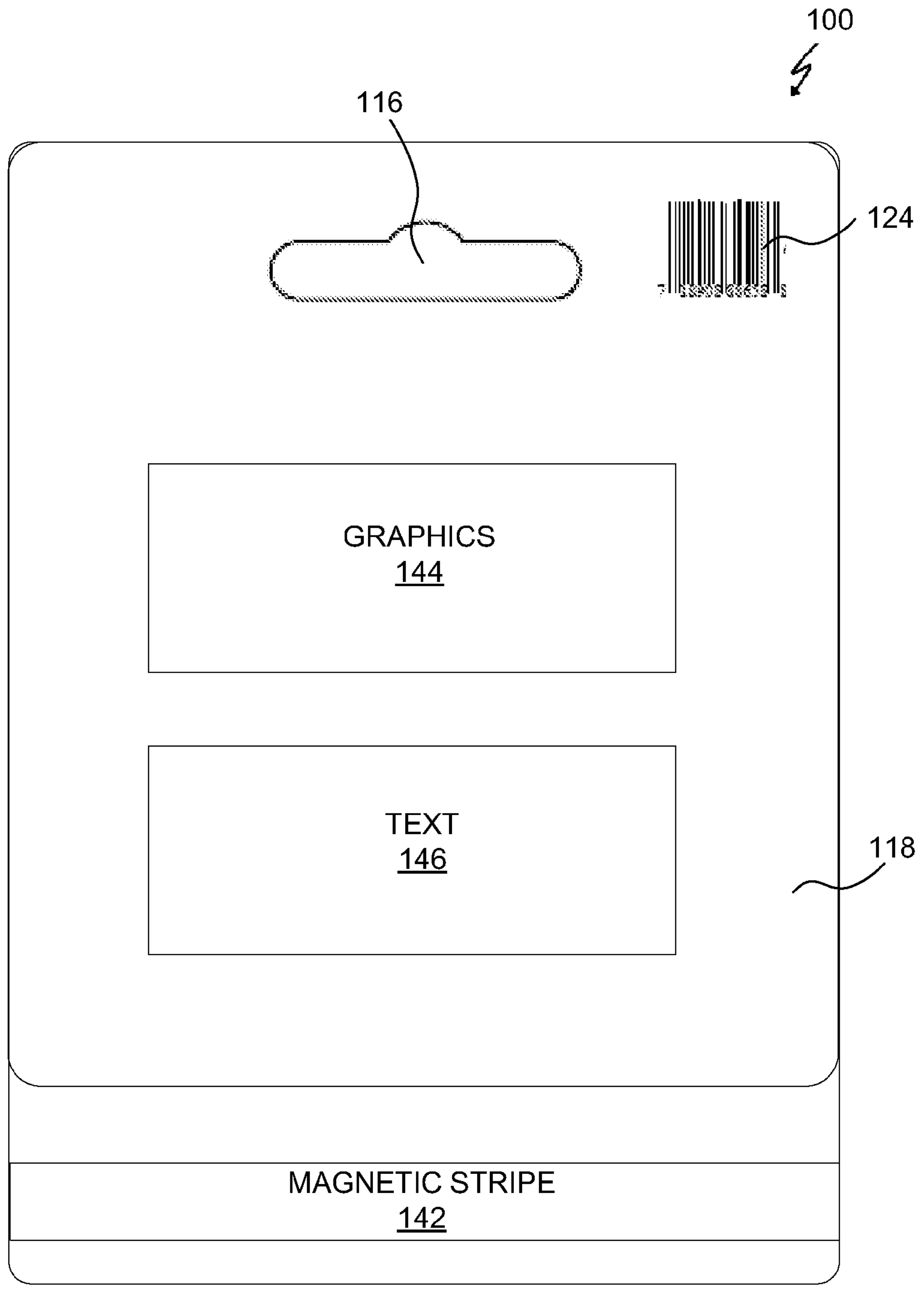

As illustrated, transaction card 106 may be positioned at a bottom half 118 of transaction card carrier 100, such that the at least one scan bar extends beyond a bottom edge 128 of the transaction card carrier 100. In one example, as illustrated in FIG. 1B, both the barcode 140 and magnetic stripe 142 may be visible. In another example, as illustrated in FIG. 1C, only the magnetic stripe 142 may be visible.

Transaction card 106 may be coupled to the transaction card carrier 100 using one or more retention mechanisms disposed thereon. The retention mechanisms may be configured to hold the transaction card 106 against the transaction card carrier 100. The retention mechanisms may, for example, include glue, tape (i.e. double sided tape), clips, slits, pockets, and/or the like. This allows a cashier to efficiently and easily swipe the scan bar without having to manipulate any part of the transaction card carrier 100, such as folding back the panels of the transaction card carrier to access the scan bars. Additionally, the transaction card 106 does not have to be removed from the transaction card carrier 100 when the transaction card 106 is purchased.

Figure 1D:
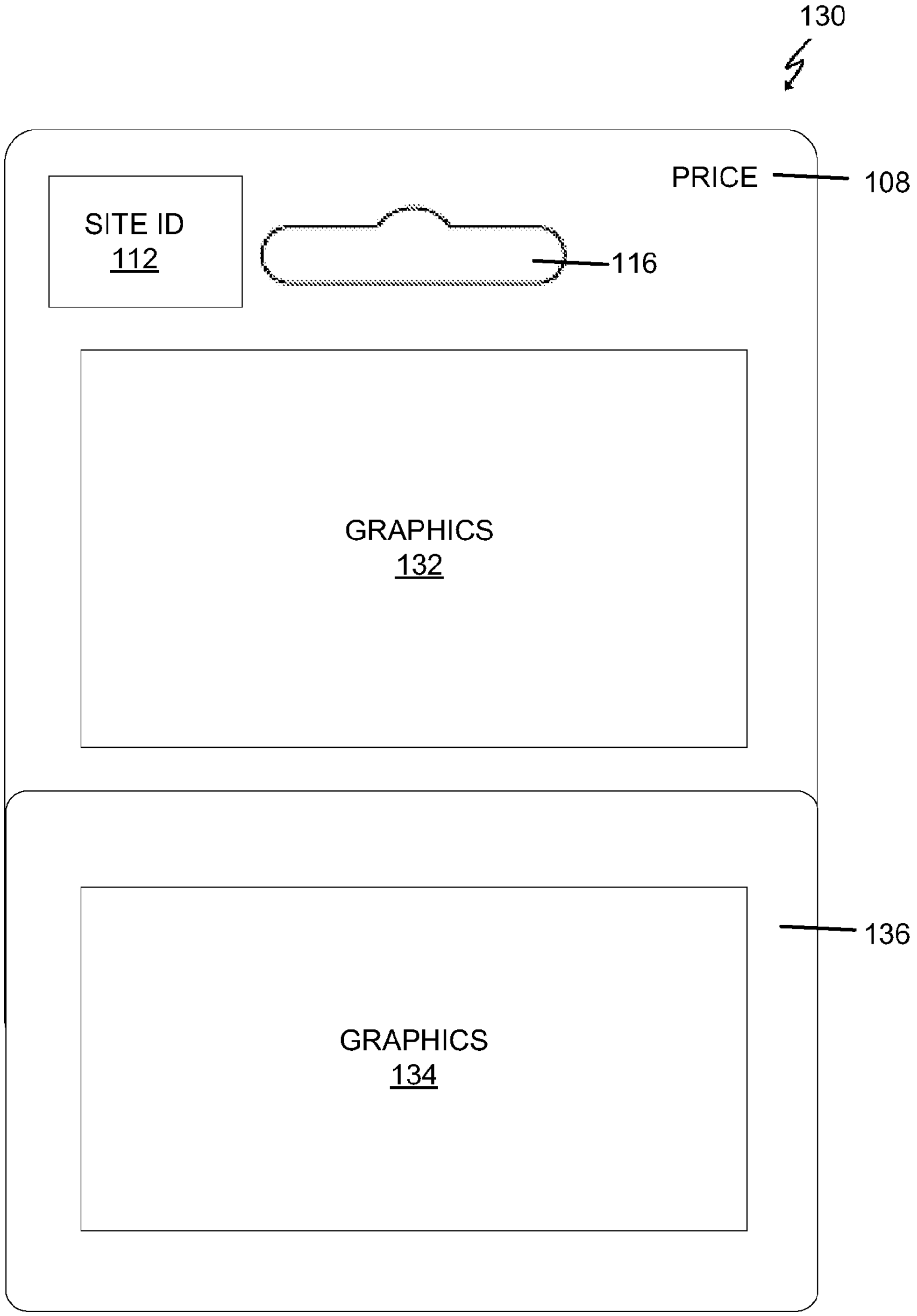

FIG. 1D illustrates another example front side or surface of a transaction card carrier having a transaction card. Although the transaction card carrier 130 may be associated with a collection of digital content, as for example, songs, podcasts, videos, audio books, television shows, and/or games for ease of discussion, the collection is generally described herein as being a playlist or album. Both front surface of transaction card carrier 130 and front surface of transaction card 136 may include any type of graphics 132, 134, such as a representation of a playlist (e.g., album) that is associated therewith. In one embodiment, graphics 132 of the transaction card carrier 130 matches the graphics 134 of the gift card 136 (e.g., have the same pattern or color).

In one embodiment, if transaction card 136 is associated with an album released by a musical artist or group, graphics 132, 134 may be a representation of the album cover. Alternatively, if transaction card 136 is associated with a playlist that has not been released, e.g., if transaction card 136 is associated with a recording made at a live concert, graphics 132, 134 may be a portrayal such as a photograph, illustration, or other artistic rendering arranged to identify an artist, group, recording, event, or title (name) associated with the playlist.

Optionally, the graphics 132, 134 can be a holographic image or an image with a holographic effect. The front surface of transaction card carrier 100 may also include a site identifier 112 that identifies a website or an application from which the associated playlist may be obtained. By way of example, site identifier 112 may identify the iTunes® online media store owned by Apple Inc. of Cupertino, Calif. as an online store from which the playlist is to be obtained. As should be appreciated, the online iTunes store of Apple Inc., now offers TV shows, movies, music videos, music albums, games, podcasts, for download to computers and media players and thus graphic images of those offerings may be associated with the online iTunes store of Apple Inc. and be used as graphics 132, 134. In fact, graphics 132, 134 may generally correspond to the icon images found at the online store.

The front surface of card carrier 130 may also include a price 108 associated with the purchase of the transaction card for electronic access to an instance of the playlist. In other words, price 108 indicates a cost associated with downloading or obtaining the playlist from the online store identified by side identifier 112.

Transaction card 136 may generally be formed from any suitable material including, but not limited to, paper, plastic, or a reflective material such as holofoil. Suitable materials may include, but are not limited to, plastics, such as polyvinyl chloride (PVC) or more environmentally friendly plastics such as corn-based plastics (e.g., polylactic acid (PLA)).

In general, transaction card carrier 130 may be sized to fit into standard slots or bins used to hold CDs or gift cards at retail outlets such as third-party retail outlets or reseller locations. When CD-sized, the height of transaction card carrier 130 may be approximately 16.5 cm, while the width of transaction card carrier 130 may be approximately 12 cm. When gift card-sized, the height of transaction card carrier 130 may be approximately 9.8 cm, while the width of transaction card carrier 130 may be approximately 8.5 cm. As shown in FIG. 2B, transaction card carrier 130 may have an associated thickness "t" 148 that may be in the range of approximately 24-30 mils. It should be understood that the size of transaction card carrier 130 may vary widely. By way of example, thickness "t" 148 may be in the range of approximately 2 mils to approximately 130 mils. Additionally, by way of example, the height of transaction card carrier 130 may be approximately 3.9 inches while the width of transaction card carrier 130 may be approximately 3.4 inches, e.g., the height may be in the range between 10 approximately 2 inches and approximately 4 inches while the width may be in the range between approximately 2 inches and approximately 3 inches.

As illustrated in FIG. 1D, transaction card 136 may have a width that is substantially similar to the width of transaction card carrier 130. In one embodiment, transaction card 136 may have a width that is the same width of transaction card carrier 130. For example, if the transaction card carrier 130 is sized to fit into standard slots or bins used to hold CDs or gift cards at retail outlets such as third-party retail outlets or reseller locations, the width of transaction card 136 may also be approximately 12 cm. In another example, when transaction card carrier 130 is sized to be gift card-sized, the width of transaction card 136 may also be approximately 8.5 cm. By way of example, the width of transaction card 136 may be in the range between 2 inches and approximately 5 inches. In one embodiment, the height of transaction card 136 may be approximately 2.1 inches. By way of example, the height of transaction card 136 may be in the range between 1 inch and approximately 5 inches. In one example, transaction card 136 may be an industry standard CR80 card.

Transaction card carrier 130 is not limited to being displayed in bins at retail outlets. In many retail outlets, gift cards and the like are displayed in a hanging manner, e.g., openings defined within gift cards or gift card holders are used to enable the gift cards to be hung on dowels or other support apparatus. If transaction card carrier 130 is to be displayed in, or is likely to be defined in, a hanging manner, an opening 116 may be included on transaction card carrier 130. Such an optional opening 116 may generally take substantially any suitable shape, such as a "sombrero" shape as shown, a circular shape, or an ovular shape.

Figure 1E:
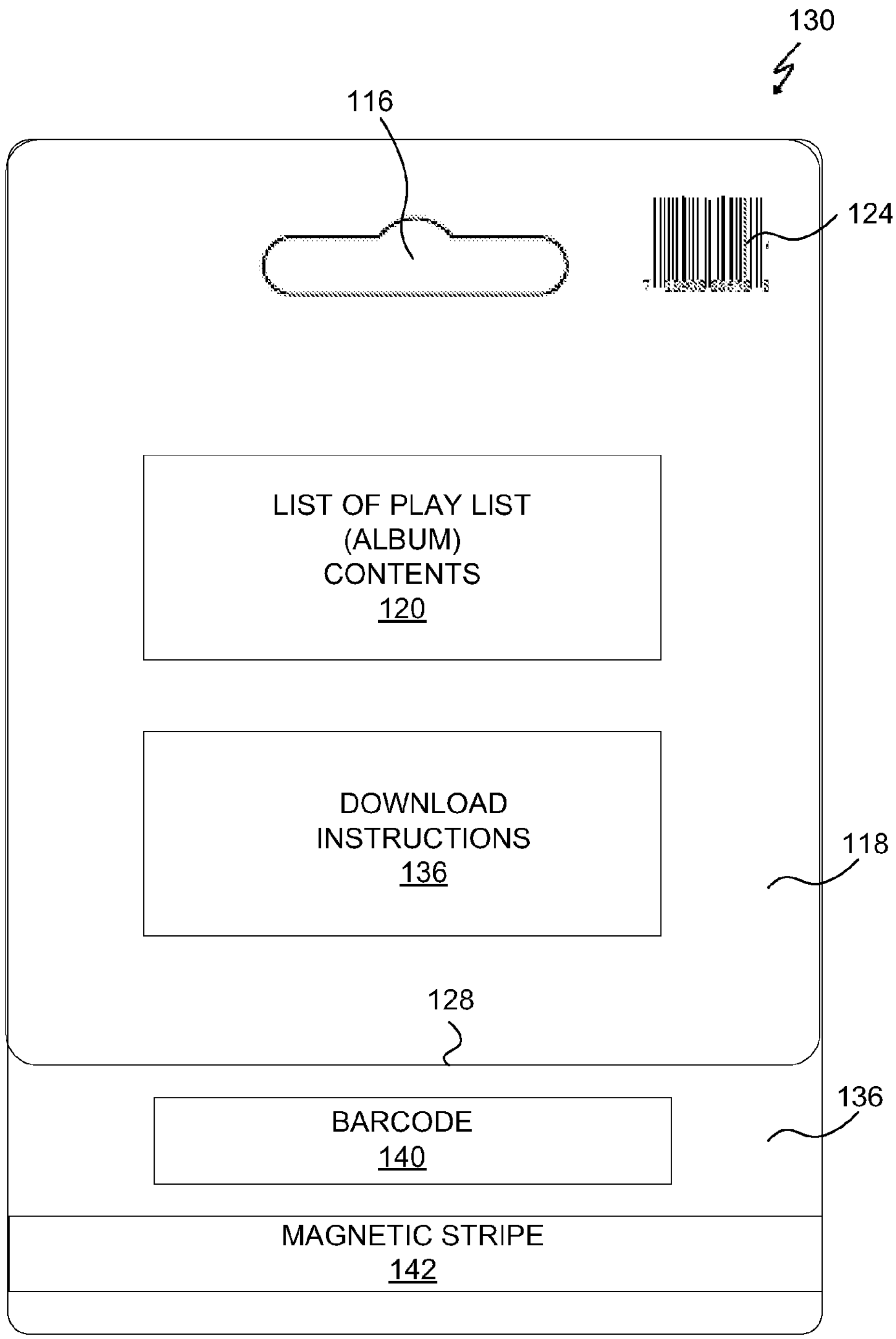

FIG. 1E illustrates an example back view of the transaction card carrier. The back side of transaction card carrier 130 may include a list 120 of playlist contents. Transaction card carrier 130 may also include download instructions 136 and/or transaction card information which allow a possessor of transaction card carrier 130 to obtain the digital files associated with list 120. For example, the transaction card information may include terms and conditions of the transaction card 136, directions on how to redeem the transaction card 136, and/or the like. List 120 identifies tracks associated with the playlist, while download instructions 136 provide instructions intended to guide a possessor of transaction card carrier 130 through a process of downloading digital files or tracks associated with list 120. A universal product code (UPC) code 124, which is arranged to be scanned as a part of an activation process, may be included on the back of transaction card carrier 130. UPC code 124 may be used at a point-of-sale to effectively charge price 108 to a purchaser for the purchase of transaction card carrier 130.

The back side of transaction card 136 may include at least one scan bar which may be used in the purchase of transaction card 136. The at least one scan bar may be, for example, a barcode 140, magnetic stripe 142, or any other scan bars that provide information or activation of transaction card 136. Bar code 140, which may be read by optical scanners or bar code readers, may include information that identifies transaction card 136. It should be understood that the format of bar code 140 may vary widely. By way of example, bar code 140 may be encoded in a code, a datamatrix 2D bar code format, or any other known format.

In one embodiment, bar code 140 may be a concealed unique code that may be concealed (or obscured) by a scratch-off material for security purposes. Bar code 140 may include an adhesive strip that is peeled off to expose a unique code, or a scratch-off label that is scratched off to expose unique code. Unique code may then be arranged to identify the playlist to be downloaded when unique code is provided to, or entered into, an appropriate website. While unique code may generally include any number of characters, e.g., numbers, unique code may include approximately sixteen characters in the described embodiment. It should be appreciated that until transaction card 136 is processed at a point-of-sale of transaction card carrier 130, i.e., until the magnetic stripe 142 is processed or swiped at a register to activate transaction card 136, transaction card 136 is essentially worthless in that digital files associated with list 120 cannot be accessed, because unique code is inactive. That is, the unique code is not redeemable for the digital files associated with list 120 until transaction card 136 is activated at a point-of-sale.

Transaction card 136 may include a magnetic stripe 142, in lieu of or in addition to a bar code 140. As will be appreciated by those skilled in the art, magnetic stripe effectively contains information that allows data stored remotely to be accessed by swiping magnetic stripe 142 past a card-reader head. A card reader head may be part of a point-of-sale device. Typically, magnetic stripe 142 is contained in a plastic-like film. As one example, magnetic stripe 142 may be located approximately 0.223 inches from the bottom edge of transaction card 136, and may have a height of approximately 0.375 inches.

As illustrated, transaction card 136 may be positioned at a bottom half 118 of transaction card carrier 130, such that the at least one scan bar extends beyond a bottom edge 128 of the transaction card carrier 130. In one example, as illustrated in FIG. 1B, both the barcode 140 and magnetic stripe 142 may be visible. In another example, as illustrated in FIG. 1C, only the magnetic stripe 142 may be visible.

Transaction card 136 may be coupled to the transaction card carrier 130 using one or more retention mechanisms disposed thereon. The retention mechanisms may be configured to hold the transaction card 136 against the transaction card carrier 130. The retention mechanisms may, for example, include glue, adhesive (e.g., silicone adhesive), tape (i.e. double sided tape), clips, slits, pockets, and/or the like. This allows a cashier to efficiently and easily swipe the scan bar without having to manipulate any part of the transaction card carrier 130, such as folding back the panels of the transaction card carrier to access the scan bars. Additionally, the transaction card 136 does not have to be removed from the transaction card carrier 130 when the transaction card 136 is purchased.

Figure 2A:
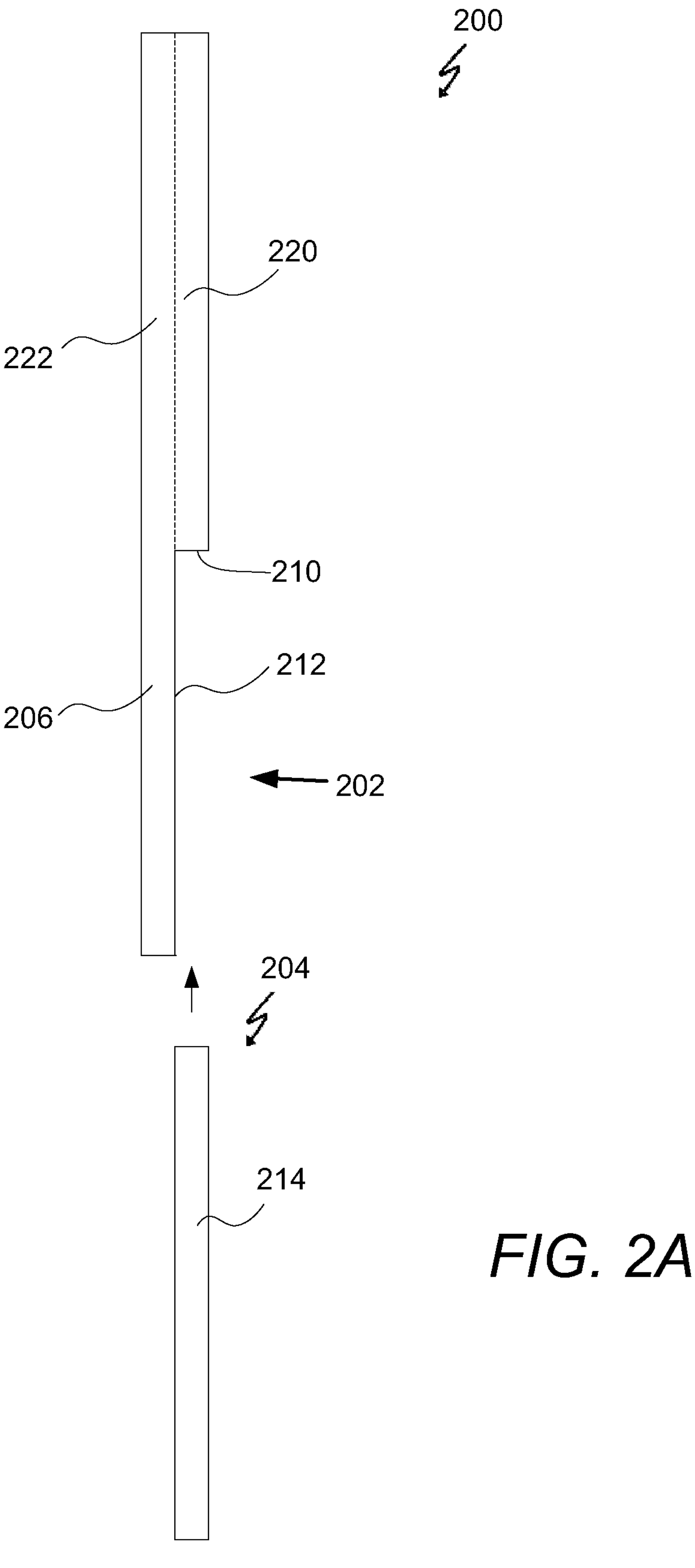
FIGS. 2A and 2B are example side diagrams of a transaction card carrier having a depression or recess portion for receiving a transaction card.
Figure 2B:
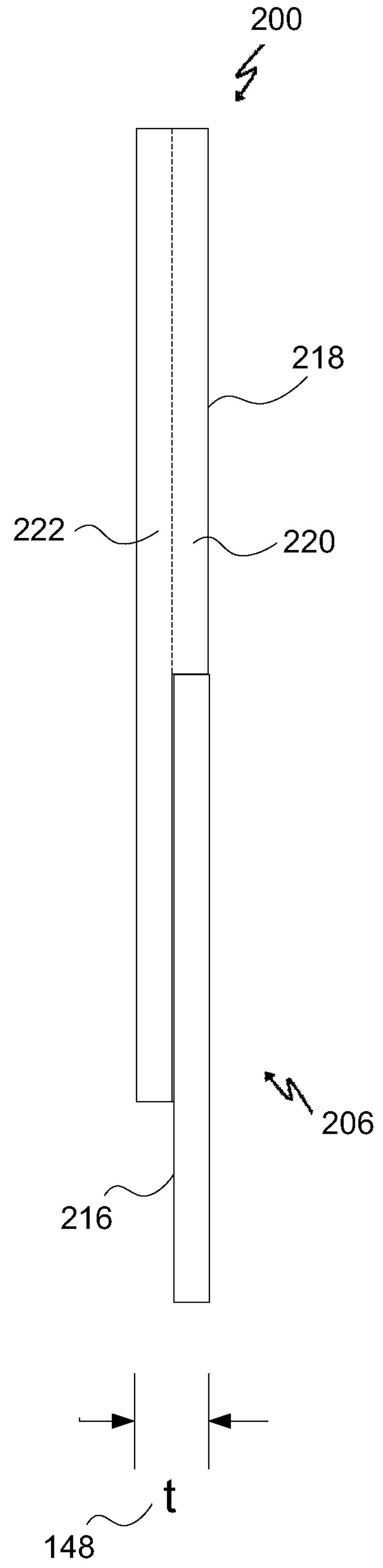

FIGS. 2A and 2B are example side diagrams of a transaction card carrier having a depression or recess portion for receiving a transaction card. As illustrated in FIG. 2A, transaction card carrier 200 may have a recess portion 202 at a bottom half 206 of the transaction card carrier 200. The recess portion 202 may be sized and dimensioned to receive the transaction card 204 so that the transaction card 204 appears to be flush mounted when the transaction card 204 is positioned inside the recessed portion 202 of the transaction card carrier 200. The shape of the recess portion 202 may correspond to the shape of the transaction card 206. The size of the recess portion 202 may correspond to a portion of the height of the transaction card 206. In one embodiment, the size of the recess portion 202 may correspond to at least half the height of the transaction card 206. The recessed portion 202 may be positioned at a bottom half 206 of the transaction card carrier 200 so that at least one scan bar (illustrated in FIG. 1B) extends beyond the bottom half 206 of the transaction card carrier 200 when the transaction card 206 is positioned inside the recessed portion 202.

The transaction card carrier 200 may be formed from a variety of materials. For example, the transaction card carrier 200 may be formed from one or more layers of material. The sheet materials may for example include plastics, paper, cardboard, fabric, and/or the like. In essence, any suitable card like material may be used.

The recess portion 202 may be formed a variety of ways. In one embodiment, the recess portion 202 is embossed or shaped into the transaction card carrier 200. In another embodiment, the recess portion 202 may be formed by coupling various layers together with at least the top layer 220 including an opening which forms the top edge 210 of the recess portion 202 and a bottom layer 222 which forms the base portion 212 of the recess portion 202. In this embodiment, the top layer 220 may have different dimensions from the second bottom layer 222. For example, the top layer 220 may have a height less than the height of the bottom layer 222.

The top layer 220 and bottom layer 222 may be formed from two separate sheets of material that are attached together. In this implementation, the sheets may be formed from the same or different materials and/or with sheets of varying thickness. For example, the top layer 220 may be formed from a first material and the bottom layer 222 may be formed from a second material. Alternatively or additionally, the top layer 220 may be formed from a first thickness and the bottom layer 222 may be formed from a second thickness. For example, the thickness of the top layer 220 may be greater than the thickness of the bottom layer 222 or alternatively the top layer 220 may have a thickness that is less than the bottom layer 222. The thickness of each portion generally depends on the desired needs of the transaction card carrier 200. In one implementation, the thickness of the top layer 220 substantially corresponds to the thickness of the transaction card 206 in order to implement flush mounting.

In another embodiment, the top layer 220 and bottom layer 222 may be formed from a single sheet of material that is folded over each other and attached together. By way of example, an adhesive may be applied to one or both of the interfacing surfaces and then the portions may be forced together thereby forming a single laminate panel. This may, for example, be accomplished by folding over or pressing one over the other.

The depth of the recess portion 202 may be widely varied. However, as illustrated in FIG. 2B, the depth of the recess portion 202 may be configured to place the bottom surface 216 of the transaction card 206 substantially flush or level with the top surface 218 of the transaction card carrier 200 (at least a majority of the transaction card 206 may be disposed within the recess portion 202). In this particular case, the depth of the recess portion 202 is generally substantially equal to the thickness of the transaction card 206. In most cases, the depth is typically configured to make the transaction card 206 appear as though it is flush mounted within the transaction card carrier 200. For example, slightly recessed, level or slightly protruding.

Figure 3:
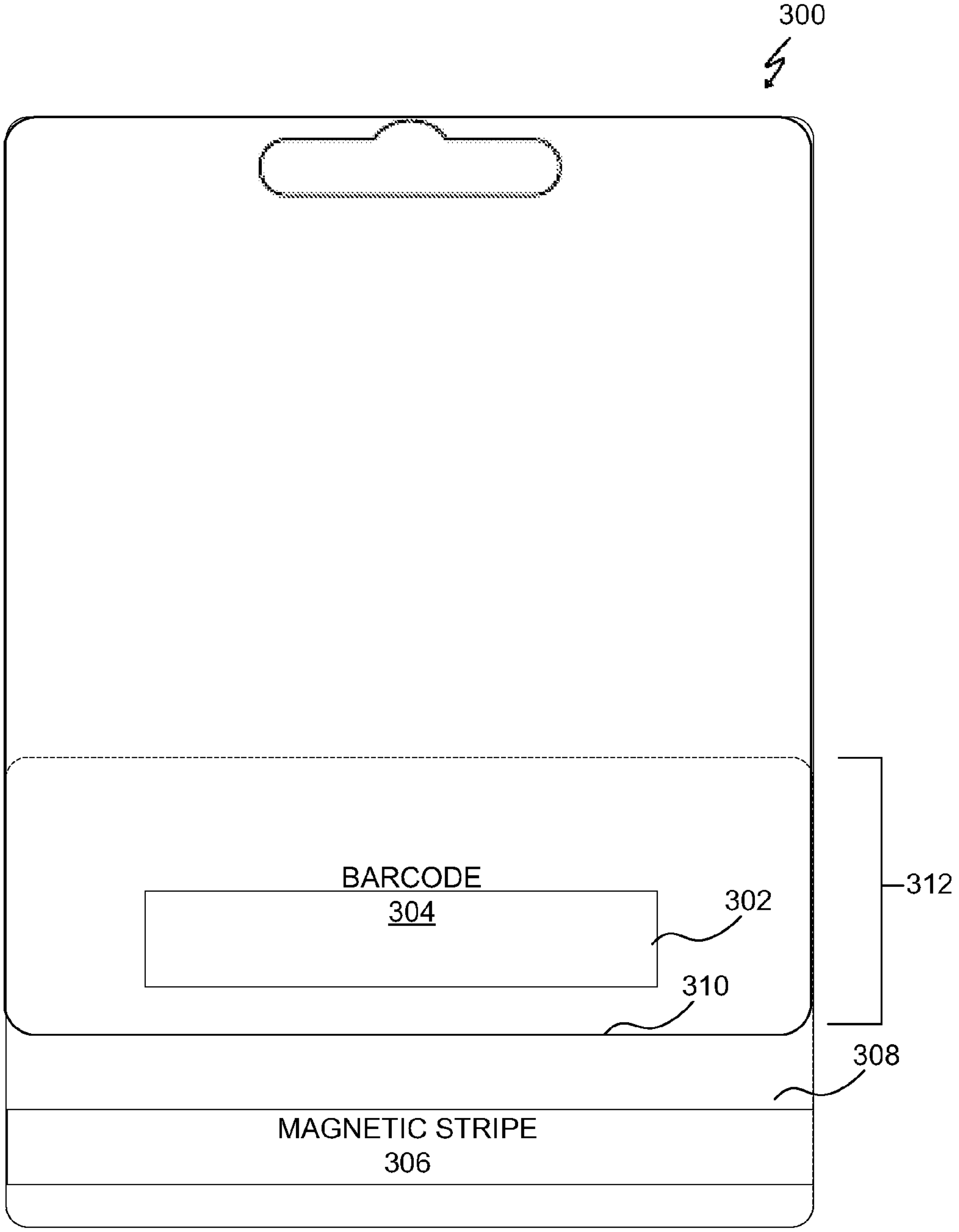
FIG. 3 is an exemplary back diagram of a transaction card carrier.

FIG. 3 is an exemplary back diagram of a transaction card carrier. The transaction card carrier or panel 300 illustrated in FIG. 3 is similar to the transaction card carrier illustrated in FIGS. 1A, 1B, and 1C except that the transaction card carrier 300 has a scan window 302. Transaction card 308 may be secured to the transaction card carrier 300 such that only the magnetic stripe 306 extends beyond the bottom edge 310 of the transaction card carrier 300.

The scan window 302 may be disposed within the mounting area 312 of the transaction card carrier 300. The scan window 302, which is typically a small opening formed in the mounting area 312, provides access to the back surface of the transaction card 308 when the transaction card 308 is placed over the mounting area 312. The scan window 302 may for example provide access to a scan bar disposed on the back surface of the transaction card 308. The scan bar may, for example, be a bar code 304 or a magnetic stripe. The scan window 302 is typically sized and dimensioned to expose the entire scan bar. As such, the transaction card 308 does not have to be removed from the carrier 300 when the transaction card 308 is purchased.

Figure 4:
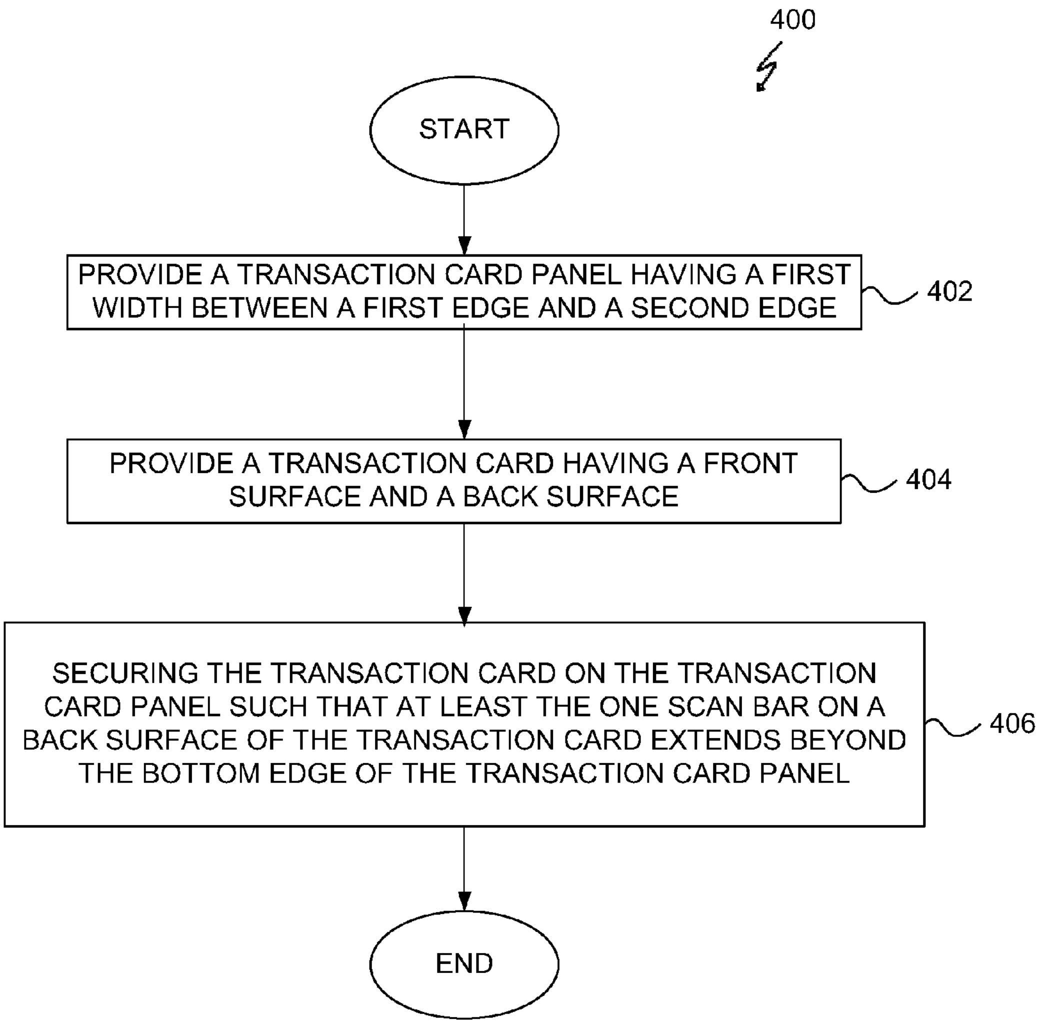
FIG. 4 is an example method of manufacturing a transaction card carrier.

FIG. 4 is an example method 400 of manufacturing a transaction card carrier. The method 400 may for example be used to create the gift card carriers disclosed in FIGS. 1, 2 and/or 3. The method 400 generally begins where a transaction card panel or carrier, having a first width between a first edge and a second edge, may be provided at 402. A transaction card having a front surface and a back surface may be provided at 404. The back surface of the transaction card may include at least a scan bar. The scan bar may be, for example, a magnetic stripe or a bar code. The transaction card may be secured on the transaction card carrier or panel such that at least the one scan bar on a back surface of the transaction card extends beyond the bottom edge of the transaction card carrier at 406. In one embodiment, a first side of the transaction card may be aligned with the first edge of the transaction card carrier and a second side of a transaction card may be aligned with the second edge of the transaction card carrier such that the width of the transaction card panel and the width of the transaction card are substantially the same. In another embodiment, the width of the transaction card panel and the width of the transaction card are the same. This allows a cashier to efficiently and easily swipe the scan bar without having to manipulate any part of the transaction card carrier, such as folding back the panels of the transaction card carrier to access the scan bars. Additionally, the transaction card does not have to be removed from the transaction card carrier when the transaction card is purchased.

Figure 5:
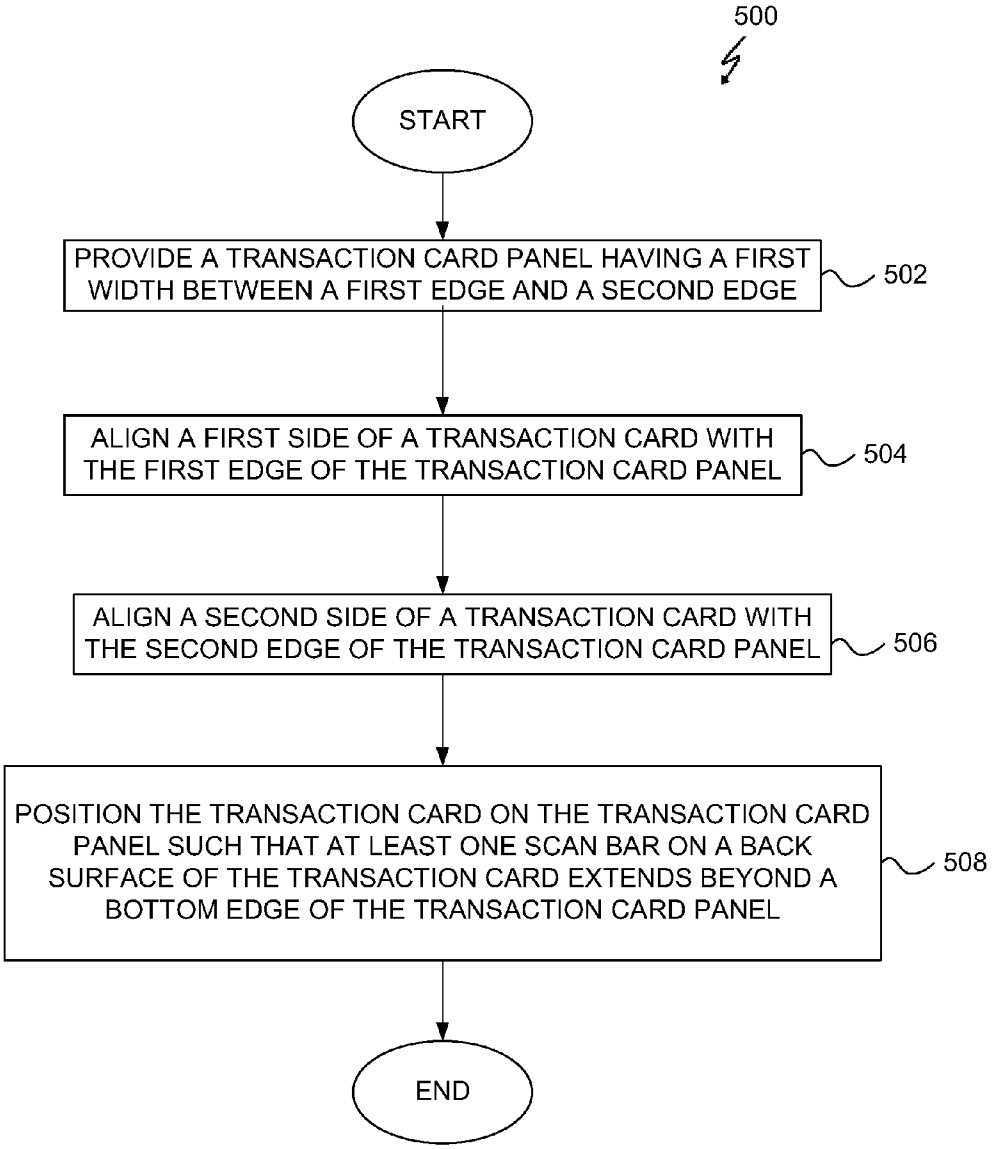
FIG. 5 is another example method of manufacturing a transaction card carrier.

FIG. 5 is another example method 500 of manufacturing a transaction card carrier. The method 500 may for example be used to create the gift card carriers disclosed in FIGS. 1, 2 and/or 3. The method 500 generally begins where a transaction card panel or carrier, having a first width between a first edge and a second edge, may be provided at 502. The first side of a transaction card may be aligned with the first edge of the transaction card panel at 504. The second side of a transaction card may be aligned with the second edge of the transaction card panel at 506. As such, the width of the transaction card panel and the width of the transaction card are substantially the same. In one embodiment, the width of the transaction card panel and the width of the transaction card are the same.

The transaction card may be positioned on the transaction card panel such that at least one scan bar on a back surface of the transaction card extends beyond a bottom edge of the transaction card panel at 508. This allows a cashier to efficiently and easily swipe the scan bar without having to manipulate any part of the transaction card carrier, such as folding back the panels of the transaction card carrier to access the scan bars. Additionally, the transaction card does not have to be removed from the transaction card carrier when the transaction card is purchased.

While this invention has been described in terms of several preferred embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A transaction card carrier, comprising:

a holder having a first width, a top edge, a bottom edge, and a recessed portion extending to the bottom edge of the holder;

a transaction card having a front surface, a back surface, and second width, the back surface of the transaction card mounted on the holder and configured to be positioned within the recessed portion; and at least one scan bar positioned on the back surface of the transaction card;

wherein, when the transaction card is mounted on the holder within the recessed portion, the at least one scan bar extends beyond the bottom edge of the holder, and wherein the first width is substantially the same as the second width.

2. The transaction card carrier of claim 1, wherein the first width is the same as the second width.

3. The transaction card carrier of claim 1, wherein the at least one scan bar is a magnetic strip or a bar code.

4. The transaction card carrier of claim 1, wherein the holder comprises a recessed portion sized and dimensioned to receive the transaction card therein so that the transaction card appears to be substantially flush mounted with a front surface of the holder when the transaction card is positioned inside the recessed portion of the holder, the recessed portion being positioned at a bottom portion of the holder so that the at least one scan bar of the transaction card extends beyond the bottom half of the holder when the transaction card is positioned inside the recessed portion of the holder.

5. The transaction card carrier of claim 1, further comprising one or more retention mechanisms disposed on the holder, the retention mechanisms being configured to hold the transaction card against the holder.

6. The transaction card carrier of claim 1, wherein the holder has a height of approximately 9.8 cm and a width of approximately 8.5 cm.

7. The transaction card carrier of claim 1, wherein the transaction card has a height of approximately 5.3 cm and a width of approximately 8.5 cm.

8. The card carrier of claim 1, wherein a purchaser pays the price to purchase the transaction card, and wherein the transaction card enables its possessor to acquire a digital download of one or more digital media assets without further cost.

9. The card carrier of claim 1, wherein a purchaser pays the price to purchase the transaction card, and wherein the transaction card enables its possessor to acquire a digital download of a collection of digital media assets without further cost.

10. The transaction card carrier of claim 9, further comprising an image disposed on the front surface of the transaction card, wherein the image is associated with the collection of digital media assets.

11. A method of manufacturing a transaction card carrier, comprising:

- providing a transaction card panel having a first width and a bottom edge, the first width between a first edge and a second edge;
- providing a transaction card having a front surface and a back surface, the back surface including at least a scan bar;
- forming a recessed portion at a bottom portion of the transaction card panel, the recessed portion extending beyond the bottom edge; and
- securing the transaction card on the transaction card panel within the recessed portion such that at least the one scan bar on a back surface of the transaction card extends beyond the bottom edge of the transaction card panel.

12. The method of claim 11, wherein the transaction card has a second width between the first edge and the second edge, and wherein the first width and the second width is substantially the same.

13. The method of claim 11, wherein the securing of the transaction card on the transaction card panel comprises aligning a first side of the transaction card with the first edge of the transaction card panel.

14. The method of claim 11, wherein the recess portion sized and dimensioned to receive the transaction card therein.

15. The method of claim 14, wherein the securing comprises flush mounting the transaction card in the recessed portion of the transaction card panel so that the transaction card appears to be flush mounted when the transaction card is positioned inside the recessed portion, wherein the at least one scan bar extends beyond the bottom portion of the holder when the transaction card is positioned inside the recessed portion of the holder.

16. The method of claim 11, wherein the at least one scan bar is a magnetic strip or a bar code.

17. The method of claim 11, further comprising affixing one or more retention mechanisms on the transaction card panel, the one or more retention mechanisms being configured to hold the transaction card against the transaction card panel.

18. The method of claim 11, wherein the transaction card panel has a height of approximately 9.8 cm and a width of approximately 8.5 cm.

19. The method of claim 11, wherein the transaction card has a height of approximately 5.3 cm and a width of approximately 8.5 cm.

20. The method of claim 19, wherein a purchaser pays the price to purchase the transaction card, and wherein the transaction card enables its possessor to acquire a digital download of a one or more of digital media assets without further cost.

21. The method of claim 20, wherein a purchaser pays the price to purchase the transaction card, and wherein the transaction card enables its possessor to acquire a digital download of at least one particular digital media asset without further cost, and

- wherein the method further comprising presenting an image on a front surface of the transaction card, the image being associated with the at least one particular digital media asset.

* * * * *